June 3, 1924.
J. A. SCHWEITZER
ADJUSTABLE PIPE HANGER
Filed Sept. 13, 1922
1,496,103
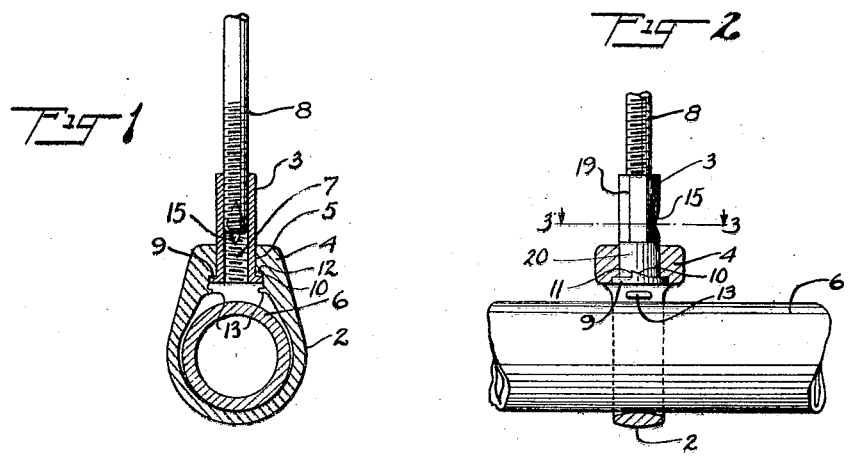
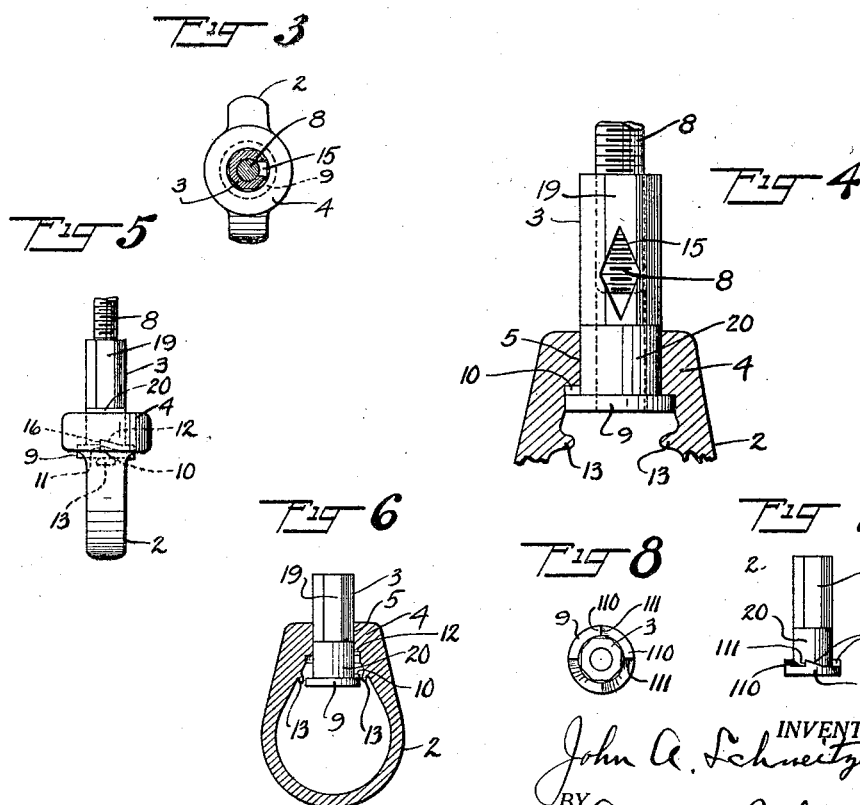
INVENTOR
John A. Schweitzer
BY
Allan M. Johnson
ATTORNEY Patented June 3, 1924.

1,496,103

UNITED STATES PATENT OFFICE.

JOHN ADAM SCHWEITZER, OF WESTFIELD, NEW JERSEY, ASSIGNOR TO HENRY B. NEWHALL, OF PLAINFIELD, NEW JERSEY.

ADJUSTABLE PIPE HANGER.

Application filed September 13, 1922. Serial No. 587,976.

*To all whom it may concern:*

Be it known that I, JOHN ADAM SCHWEITZER, a citizen of the United States, residing at Westfield, in the county of Union and State of New Jersey, have made certain new and useful Improvements in Adjustable Pipe Hangers, of which the following is a description, taken in connection with the accompanying drawings.

My invention relates to pipe hangers and more particularly to adjustable pipe hangers which permit the pipe to be readily adjusted at any desired elevation or slant. It further relates to automatic locking means, to automatically lock the pipe hanger in any adjusted position without any further manipulation or work by the mechanic installing the run of pipe.

My invention further relates to certain combinations, details of construction and articles of manufacture, which will be more fully hereinafter described and pointed out in the claim.

In the accompanying drawings, the same reference numerals refer to similar parts in the several figures.

Fig. 1 is a vertical section through a pipe hanger shown in cooperation with a suspension rod, the pipe supported being shown in section;

Fig. 2 is a side elevation of my pipe hanger, partly broken away for purpose of illustration, the pipe being shown in side elevation;

Fig. 3 is a horizontal section on the line 3—3 of Fig. 2, looking in the direction of the arrows;

Fig. 4 is a detail vertical section on an enlarged scale;

Fig. 5 is a side elevation, on a smaller scale, showing the supporting member or ring elevated to clear the locking member so as to permit adjustment of the pipe hanger in one direction;

Fig. 6 is a vertical section showing the manner of assembling the two rotatable members of my adjustable pipe hanger;

Fig. 7 is a side elevation of a modified form in which a plurality of locking members are employed;

Fig. 8 is a plan view of the sleeve or rotating member shown in Fig. 7.

My invention is adapted for universal application wherever it is desirable to support pipes or similar members from a wall or ceiling. It is more particularly adapted for use in installing automatic sprinkler systems. In such installations, the horizontal runs of pipe are supported from the ceiling at varying distances being inclined with relation to the feeder pipes and the ceiling. This requires careful adjustment to get the runs of pipe at the proper inclination.

In my invention I form an adjustable pipe hanger of two rotatable members which will be instantly and automatically locked in any adjusted position without further manipulation by the mechanic. I am aware that there are adjustable pipe hangers on the market in which locking members are employed, but these members have to be bent or otherwise manipulated by the mechanic after he has gotten the correct adjustment. A careless or inefficient mechanic often forgets to operate the additional locking member so that the jarring of the building, or other vibration, will cause the members to rotate upon each other to raise or lower the hanger and get the run of pipe out of its proper adjusted position with relation to the ceiling and the source of supply.

Various forms of my pipe hanger may be made all of which come within the terms of my invention as herein pointed out and set forth in the claim.

By way of illustration I have shown one form of my invention in which the adjustable pipe hanger 1 consists of two rotating members 2 and 3. The member 2 is preferably the supporting member for the pipe 6 and is in the form of a ring having a head 4, through which extends an opening or eye 5. Cooperating with this supporting member or ring 2 is the other rotatable member 3 in the form of a sleeve having its interior provided with female screw-threads 7 to cooperate with the male threads upon the suspension rod 8. This rod 8 is supported from the ceiling in any suitable manner to give the required support and is held from rotation.

In the form of my invention illustrated by way of example, the lower end of the rotatable member or sleeve 3 is provided with a flange 9. In assembling the parts, the sleeve 3 is passed through the opening or eye 5 in the head 4 of the supporting member or ring 2, as shown for example in Fig. 6.

Between the sleeve 3 and the supporting member or ring 2, I locate any suitable automatic locking means, which will permit the rotation of one member with relation to the other in one direction, but automatically prevents rotation in the other direction unless the locking mechanism is intentionally brought into its inoperative position.

I have shown a locking mechanism, by way of example, having the cam 10 with a shoulder 11 mounted upon the flange 9 of the sleeve 3 and cooperating with a similar cam 12 and shoulder 16, mounted on the interior of the head 4 of the supporting member or ring 2. The inclined surfaces of the cams are so located that the sleeve 3 can be freely rotated from the left to the right, Fig. 2, or turned clock-wise to screw up on the suspension rod 8, and thereby raise the supporting member or ring 2. The moment that the parts have been brought into proper adjustment it will be impossible to rotate them in the opposite direction, or counter clock-wise, for the reason that the shoulders 11 and 16 of the cams 10 and 12 would contact and prevent further rotation. The parts will therefore be locked automatically in their adjusted position without any further manipulation by the mechanic. Moreover, it will be impossible for him to forget to operate the locking means as they are automatic.

When it is desired to adjust the sleeve 3 in the opposite direction to lower the hanger 1, the supporting member or ring 2 is temporarily elevated with relation to the sleeve 3 so that its cam 12 and shoulder 16 will be free from contact with the cam 10 and shoulder 11 on the flange 9 of the sleeve 3. This will then permit the sleeve 3 to be rotated downward upon the threads of the suspension rod 8 counter clock-wise, or from right to left, Fig. 2. The moment that the proper elevation for the pipe hanger has been obtained, the supporting ring or member 2 is permitted to assume its normal position as shown in Fig. 1. This will again automatically lock the members 2 and 3 together so that no vibration or jarring will cause them to rotate on each other and get the run of pipe out of its proper alinement.

To prevent accidental disassembling of the supporting member or ring 2 and the sleeve 3 after they are once assembled, I provide any suitable means to hold them together without interfering with the operation of the members, as just described.

I have shown for example the supporting member or ring 2, which is preferably made of malleable iron, or other ductile metal, formed with lugs 13, 13 as shown in Fig. 6. These are preferably cast so as to permit the ready assembling of the parts as shown in that figure. After the sleeve 3 has been passed through the eye or opening 5 in the head 4 of the ring 2, the lugs 13, 13 are bent up in any suitable manner, as by a blow from a hammer, and brought into the position shown in Fig. 1, and on an enlarged scale in Fig. 4. These lugs 13, 13 are located a sufficient distance beneath the flange 9 so that the supporting member or ring 2 can be lifted to free the automatic locking cams 10 and 12 and shoulders 11 and 16.

In Figs. 1 to 6, inclusive, I have shown the sleeve 3 provided with one cam. In Figs. 7 and 8, I have shown the sleeve 3 provided with a plurality of cams 110, 110, and shoulders 111, 111.

In all forms, the exposed portion 19 of the sleeve 3 is made non-circular, preferably octagonal, so as to readily engage with a monkey wrench or other tool to permit the pipe hanger to be adjusted up or down upon the extension rod 8. A portion 20 of the sleeve 3 is formed cylindrical to snugly fit the round opening or eye 5 in the head 4 of the ring or supporting member 2.

I preferably provide my sleeve 3 with a cutaway portion or window 15 so that the mechanic can see whether or not the end of the suspension rod 8 has sufficient purchase or engagement with the threads 7 on the interior of the sleeve 3. If the end of the rod 8, or any portion of the rod 8 is visible through the window 15, the mechanic will know that there is a safe engagement between the sleeve and the rod.

Having thus described this invention in connection with illustrative embodiments thereof, to the details of which I do not desire to be limited, what is claimed as new and what is desired to secure by Letters Patent is set forth in the appended claim.

What I claim is:—

In a pipe hanger the combination of two members adapted to have vertical and rotative movement on each other, one of the members being adapted to hold the pipe and the other member provided with screw-threads to cooperate with a bolt, and locking means mounted on the two members and held in engagement by the weight of the pipe to prevent relative rotation of the members in one direction, said locking means being thrown into their inoperative position by sliding the pipe supporting member vertically on the other member.

JOHN ADAM SCHWEITZER.

Witnesses:
CLIFFORD WILLIS,
ANNA REDER.